United States Patent
Uusimäki et al.

(10) Patent No.: US 9,843,185 B2
(45) Date of Patent: Dec. 12, 2017

(54) STARTING OF A SOLAR POWER PLANT

(71) Applicant: ABB Oy, Helsinki (FI)

(72) Inventors: Jari Uusimäki, Espoo (FI); Jarkko Hyttinen, Helsinki (FI); Janne Hellberg, Espoo (FI)

(73) Assignee: ABB Oy, Helsinki (FI)

( * ) Notice: Subject to any disclaimer, the term of this patent is extended or adjusted under 35 U.S.C. 154(b) by 1041 days.

(21) Appl. No.: 14/054,889

(22) Filed: Oct. 16, 2013

(65) Prior Publication Data

US 2014/0103729 A1  Apr. 17, 2014

(30) Foreign Application Priority Data

Oct. 16, 2012  (EP) .................................... 12188659

(51) Int. Cl.
 *H02J 1/10* (2006.01)
 *H02J 3/38* (2006.01)

(52) U.S. Cl.
 CPC .............. *H02J 1/102* (2013.01); *H02J 3/385* (2013.01); *Y02E 10/58* (2013.01); *Y10T 307/729* (2015.04)

(58) Field of Classification Search
 CPC .... H02J 1/102; H02J 3/385; H02J 9/06; H02J 9/061; Y02E 10/58; Y10T 307/729; H02H 11/00; H03K 17/0822; H05B 39/08
 USPC ........................................................ 307/125
 See application file for complete search history.

(56) References Cited

U.S. PATENT DOCUMENTS

| | | | |
|---|---|---|---|
| 7,962,249 B1 | 6/2011 | Zhang et al. | |
| 8,909,477 B2* | 12/2014 | Schietke | F03D 7/026 290/44 |
| 2005/0002214 A1* | 1/2005 | Deng | G05F 1/67 363/131 |
| 2005/0018454 A1* | 1/2005 | Deng | H02J 7/35 363/49 |
| 2012/0104758 A1* | 5/2012 | Schietke | F03D 7/026 290/44 |

OTHER PUBLICATIONS

European Search Report dated Oct. 11, 2013 for European Application No. 12188659.

* cited by examiner

*Primary Examiner* — Thienvu Tran
*Assistant Examiner* — Brian K Baxter
(74) *Attorney, Agent, or Firm* — Taft Stettinius & Hollister LLP

(57) ABSTRACT

A method of optimizing one or more starting parameters of a solar power generator system and a solar power generator system, wherein the solar power generator system includes a solar panel array and a converter for converting power obtained from the panel array. The method can include measuring an output voltage of the panel array, comparing the output voltage with a starting voltage ($V_{dc}$), starting the solar power generator system when the output voltage of the panel array exceeds the starting voltage ($V_{dc}$), measuring the obtained power from the solar panel array after a morning start, comparing the obtained power with a known limit value, and changing the one or more starting parameters on the basis of the comparison of power.

20 Claims, 3 Drawing Sheets

STARTING OF A SOLAR POWER PLANT

RELATED APPLICATION

This application claims priority under 35 U.S.C. §119 to European Patent Application No. 12188659.2 filed in Europe on Oct. 16, 2012, the entire content of which is hereby incorporated by reference in its entirety.

FIELD

The present disclosure relates to photovoltaic power generation, and for example starting of a photovoltaic power generation system.

BACKGROUND INFORMATION

Photovoltaic (PV) power generation systems can include one or more photovoltaic panels forming a panel array. The panel array is connected to power electronic devices that are used for optimizing the energy capture from the panels and for supplying the generated power to a grid or to energy storages. The power electronic devices can include one or more converter stages for modifying the voltage and/or current obtained from the panel array. The power electronic devices in the PV systems have been referred to as solar inverters or PV inverters although the devices can include other converter topologies than an inverter.

Solar power plants or photovoltaic power generation systems operate in changing environmental conditions. The environmental conditions change seasonally and with the weather. This leads to the fact that the criteria used for setting parameters for the optimal starting conditions are not constant. If a PV generator is started too early in the morning, it will not produce enough power and will be shut down, to be started again later. Such unnecessary starts and shutdowns wear down the components of the power generator system.

On the other hand, if the generator system is started too late, some of the energy is lost; e.g., all possible energy from the solar panels is not fed to the electrical grid.

It is known to optimize the parameters acting as starting criteria for the converters connected to a solar panel system according to changing conditions. Examples of the starting criteria are the voltage from the panel array and the time delay for the start. According to these criteria, the morning start-up procedure includes monitoring the open circuit voltage from the panel array, and when the voltage exceeds a set limit, the solar inverter is started after the time period set by the time delay has expired. In known systems these parameters are corrected manually according to prevailing conditions. The manual setting of parameters for the starting criteria can involve additional work both in the commissioning and during the operation of the solar power plant.

The manual optimization of the parameters further leads to non-optimal situations due to the changing conditions. For example, when the PV panels are covered with dust the power generating system is not able to start with the criteria initially set for clean panels. The same problem occurs when panels or their connections are faulty. Correspondingly, when old panels are replaced with new ones or when panels are serviced, the criteria set for starting are no longer optimal.

It is also known to optimize the starting parameters by using external irradiation or temperature sensors. Such external sensors, however, can add to the complexity and costs of the system. Further, these external sensors cannot take into account changes occurring in the PV panels. Such changes occur, for example, when the panels grow old or dirty.

SUMMARY

A method is disclosed of optimizing one or more starting parameters of a solar power generator system, wherein the solar power generator system includes a solar panel array and a converter for converting power obtained from the panel array, the method comprising: measuring an output voltage of the panel array; comparing the output voltage with a starting voltage ($V_{dc}$); starting the solar power generator system when the output voltage of the panel array exceeds the starting voltage ($V_{dc}$); measuring obtained power from the solar panel array after a morning start; comparing the obtained power with a known limit value; and changing the one or more starting parameters on the basis of the comparing of power.

A solar power generator system is disclosed, comprising: a solar panel array and a converter for converting power obtained from the panel array; means for measuring an output voltage of the panel array; means for comparing the output voltage with a starting voltage ($V_{dc}$); means for starting the solar power generator system when the output voltage of the panel array exceeds the starting voltage ($V_{dc}$); means for measuring the obtained power from the solar panel array after the start; means for comparing the obtained power with a known limit value; and means for changing the one or more starting parameters on the basis of the comparison of power.

BRIEF DESCRIPTION OF THE DRAWINGS

In the following, features of the present invention will be described in greater detail by reference to exemplary embodiments and with reference to the accompanying drawings, in which.

DETAILED DESCRIPTION

Figure 1:
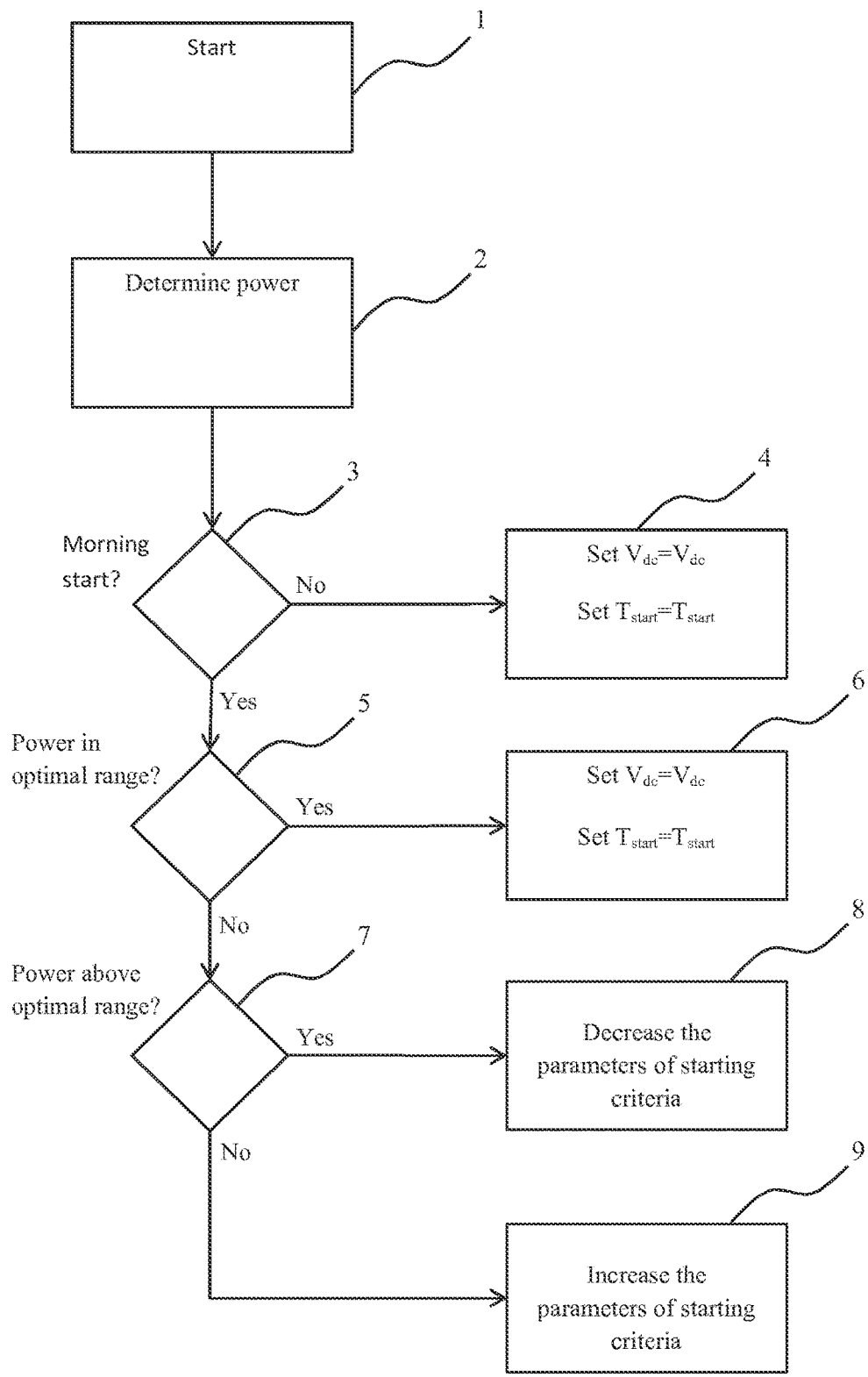
FIG. 1 shows a flowchart of an exemplary embodiment disclosed herein.

A method and a system are disclosed for optimizing starting parameters on the basis of measured active power obtained from a panel array after start-up. The measured active power can be compared with a known optimal power specified for a successful start-up, and the starting parameters can be changed based on the comparison.

The parameters of the starting criteria can be changed automatically such that the start-up is adapted to possibly changing conditions. Such changing conditions are, for example, changed topology or amount of PV panels and/or changed atmospheric conditions. With exemplary embodiments of the present method and system, the operating personnel of the solar power generator system does not need to change the parameters manually during the commissioning or operation of the system.

When a solar panel array receives irradiation from the sun after the night, the open circuit voltage of the panels starts to rise. Once the open circuit voltage exceeds a limit value set for the morning start, the operation of the power generator system (e.g., the one or more converters), is started after a time delay. The length of the delay $T_{start}$ and the voltage limit $V_{dc}$ are parameters that are set for the morning start-up. In exemplary embodiments disclosed herein, once the converters of the system are started, the actual power $P_{ac,k}$ obtained from the panel array can be determined. For example, the power is determined from the measured values of current and voltage from the panel array. The power is not necessarily determined from the current and voltage directly from the panel. The power can be determined from the current and voltage measured in the converter. Instead of both current and voltage being measured values, one of the values may also be a reference value outputted by some control circuit in the converter structure. Further, the power may also be determined from the current outputted by the converter system when the output voltage has a fixed value.

Once the power $P_{ac,k}$ of the system after the starting instant is determined, it can be compared with a limit value $P_{ac,opt}$. The limit value represents the optimal starting power level needed for keeping the converter system reliably in operation. The converter system of a PV power generation system uses power for the operation of the system. This means that some of the power obtained from the panel array is used by the converter system and some of the power is dissipated in the system as power losses. These losses are somewhat known so that a limit value $P_{ac,opt}$ may be estimated for the system prior to the operation of the system. The power output from the panel array should exceed the limit value so that the operation of the converter system and the outputting of power are possible. The limit value may contain a safety margin so that values somewhat lower than the limit are sufficient for operating the converter system.

If the actual power $P_{ac,k}$ of the system is near the limit value $P_{ac,opt}$, it is determined that the starting parameters for the morning start-up does not need changing. If, however, the actual power $P_{ac,k}$ is by a certain amount higher or lower than the limit value, changes can be made to the starting parameters. In an exemplary embodiment of the method, certain hysteresis change limits are determined, and once the actual power is outside the range of these limits, the starting is not optimal. In this embodiment, it can be thus checked whether:

$$P_{ac,opt} - P_h \leq P_{ac,k} \leq P_{ac,opt} + P_h \quad (1)$$

in which $P_h$ is the defined hysteresis limit. As already mentioned, for an exemplary embodiment, if $P_{ac,k}$ satisfies the condition of (1), the starting parameters are not changed.

If the actual power $P_{ac,k}$ is higher than the limit value to which the hysteresis limit is added (i.e., $P_{ac,k} > P_{ac,opt} + P_h$), the power output at the start-up exceeds the specified minimum power, and the power plant can be started earlier. The earlier start-up is carried out by changing one or more of the starting parameters.

As already mentioned, the starting criteria can include the starting voltage $V_{dc}$ and time delay $T_{start}$. In an exemplary embodiment, once the actual power $P_{ac,k}$ is higher than the limit value to which the hysteresis limit is added, it is determined whether the starting voltage is higher than the minimum starting voltage $V_{dc,min}$. The minimum starting voltage is a value of voltage obtained from the panels at which the start-up can be successful. If the determined starting voltage is above the minimum starting voltage, the value of the starting voltage is lowered. The lowering of the starting voltage $V_{dc}$ is, for example, carried out by subtracting a fixed voltage value $V_{step}$ from the previous starting voltage. In an exemplary embodiment of the method, the voltage value $V_{step}$ may also be a variable calculated by a function. This function may relate to, for example, historic data; e.g., selecting a larger step size if consecutive start-ups result in lowering the starting voltage. The function may also relate to the current value of the starting voltage; e.g., smaller step sizes if the starting voltage is near the minimum starting voltage.

If for example the starting voltage is not higher than the minimum starting voltage, the starting voltage is not changed. The starting voltage is thus given the value of the minimum starting voltage.

In another exemplary embodiment, the one or more of the starting parameters to be changed is the value of the time delay $T_{start}$. Once the determined actual power $P_{ac,k}$ is higher than the sum of the limit value and the hysteresis limit, the start of the PV power generation system is made earlier by decreasing the time delay $T_{start}$, unless the value of the time delay is at the minimum level. Thus in an exemplary method, if it is determined that the value of the time delay $T_{start}$ is higher than the minimum allowable value $T_{start,min}$, the value of the parameter $T_{start}$ is decreased. As in connection with the starting voltage, the starting time delay is for example decreased stepwise by subtracting a constant $T_{step}$ from the value of $T_{start}$ used. If $T_{start}$ is not higher than the value of $T_{start,min}$, the value of $T_{start,min}$ is given to the parameter $T_{start}$.

According to another exemplary embodiment, the starting time delay is changed according to a function which may be related to historic data (e.g., previous morning start-ups), or to the difference between the current value of $T_{start}$ and the minimum allowable value $T_{start,min}$.

According to an exemplary embodiment, once the starting power is above the range of optimum values of power (e.g., higher than the sum of the limit value and the hysteresis limit), both the starting time and the starting voltage are changed according to the above procedure.

If the actual power $P_{ac,k}$ is lower than the limit value from which the hysteresis limit is subtracted (i.e., $P_{ac,k} < P_{ac,opt} - P_h$), the power output at the start-up is not sufficient and the starting parameter should be changed. The hysteresis limit is for example set in such a manner that starting the converter system is still possible even when the actual power is somewhat below the range. When the start-up power is below the range, it should be ensured that one or more of the parameters set for starting are increased.

The procedure for increasing the starting parameters is the opposite to the above-described procedure of decreasing the parameters. According to an exemplary embodiment, once the actual power $P_{ac,k}$ is below the allowable range, it is examined whether the starting voltage $V_{dc}$ is below a set maximum value for the starting voltage $V_{dc,max}$. If the starting voltage is lower than the maximum value, the starting voltage is increased. The starting voltage is for example increased by adding a constant value $V_{step}$ to the prevailing starting voltage. The value added to the starting voltage may also be calculated based on historic data or the difference between the current value of the starting voltage and the maximum value of the starting voltage, as in the case of decreasing the parameters.

If the starting voltage is not lower than the maximum value $V_{dc,max}$, the starting voltage $V_{dc}$ obtains the value of the maximum voltage $V_{dc,max}$.

According to another exemplary embodiment, one or more of the starting parameters are increased by increasing the time delay $T_{start}$. Thus according to this embodiment, it is determined if the time delay $T_{start}$ is lower than a maximum starting time delay $T_{start,max}$. If this is the case, the value of time delay is increased by a time step $T_{step}$. If the time delay $T_{start}$ is not lower than the maximum starting time delay, the value of the maximum starting time delay is given to the time delay $T_{start}$. As above, the value of the time step $T_{step}$ for changing the time delay is for example constant or it can be a variable calculated with a function that takes into account historic data or the margin between the current value of $T_{start}$ and the maximum value of the starting delay.

According to an exemplary embodiment, both the time delay and the starting voltage are changed according to the above procedure when the starting power is below the optimal power.

The above-determined parameters for start-up (e.g., the time delay $T_{start}$ and the starting voltage $V_{dc}$), are stored in the system so that in the next start-up in the morning these parameters are put to use. Further, according to an exemplary embodiment, the values of the time delay and/or the starting voltage are stored so that historic data is gathered. This data is used for determining whether the system is slowly becoming defective. If, for example, the time delay $T_{start}$ and the starting voltage $V_{dc}$ grow to maximum limits within a short time or change rapidly, it is possible that the system suffers from a fault. It is thus possible to use the changed parameters for producing an alarm to the maintenance personnel so that the system can be checked and possibly repaired before a total failure of the system. Similarly, exemplary methods disclosed herein can give an indication of panels covered with snow.

When a solar power plant is equipped with a system implementing methods disclosed herein, the end user of the power plant does not have to set the starting parameters. Further, the properties of the PV panels need not to be known since the method adapts itself. If some PV panels are added to the system or old ones are replaced, the starting parameters adapt automatically without any effort from the personnel. Similarly, when the panels of the system grow old and the power output from the panels is slowly decreasing, the method adapts the parameters to the changed output level. Further, the method and system will observe if a string of the panel array or a DC fuse is faulty and change the starting parameters.

The method and system can also observe automatically changing atmospheric conditions in the starting parameters. These changing conditions include yearly temperature variations and the changing rising angle of the sun. The temperature of the panel array affects the open circuit voltage that is compared with the starting voltage limit while the rising angle of the sun relates to the length of the time delay. Both of these factors are taken into account separately and automatically in the present disclosure. The open circuit voltage of a panel array is higher in connection with a lower temperature. However, when the panels are loaded (e.g., connected to the converter), the voltage drops if the irradiation to the panels is not sufficient. Therefore, the varying temperature should be taken into account in the starting parameters. In exemplary embodiments, the temperature is taken into account automatically. Similarly, during the course of its yearly rotation the sun rises more quickly at certain times of the year. The rising speed or the rising angle is taken into account in the time delay used in starting the converter system. In an exemplary embodiment, the time delay adapts automatically so that the rising time of the sun is taken into account in the parameters.

For example, when the days grow shorter, the morning temperatures tend to decrease. The decrease in the temperature increases the open circuit voltage of the panels. The increase of voltage due to the lower temperature makes the converter system start with too low an amount of produced power if the starting parameters are not changed. By increasing the starting voltage, the increased open circuit voltage due to the lower temperature is taken into account.

Similarly, when the rising time of the sun grows longer, the time delay used in starting the converter system should be prolonged so that the irradiation to the panels of the system is sufficient for starting up the converter system.

Figure 2:
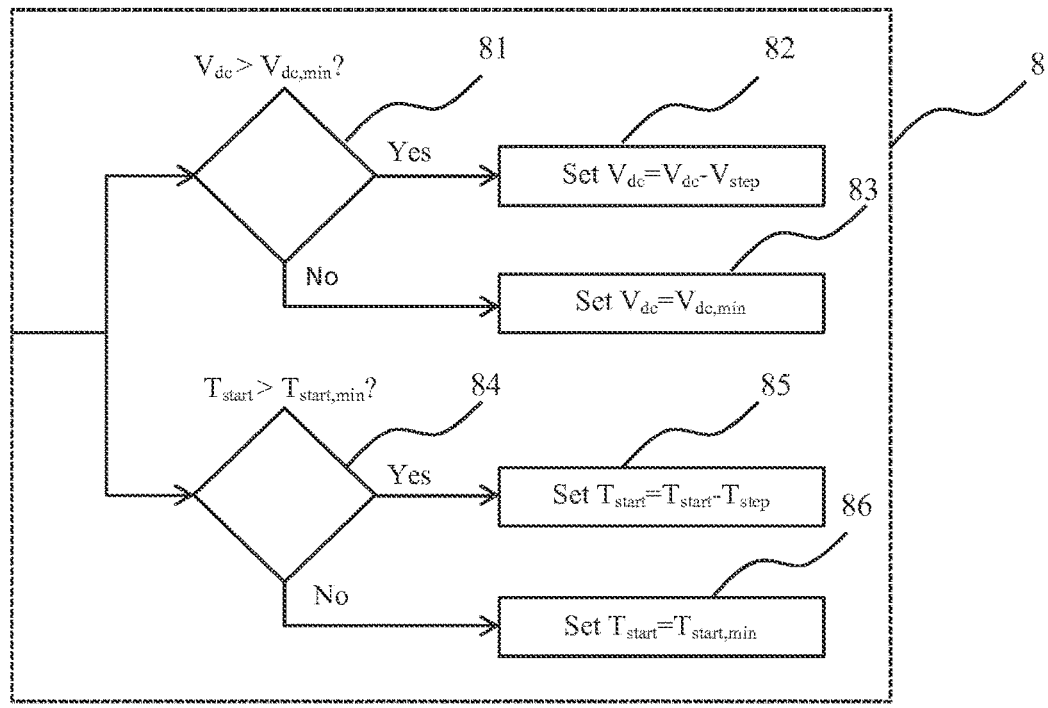
FIG. 2 shows a flowchart of an exemplary embodiment of decreasing starting criteria.
Figure 3:
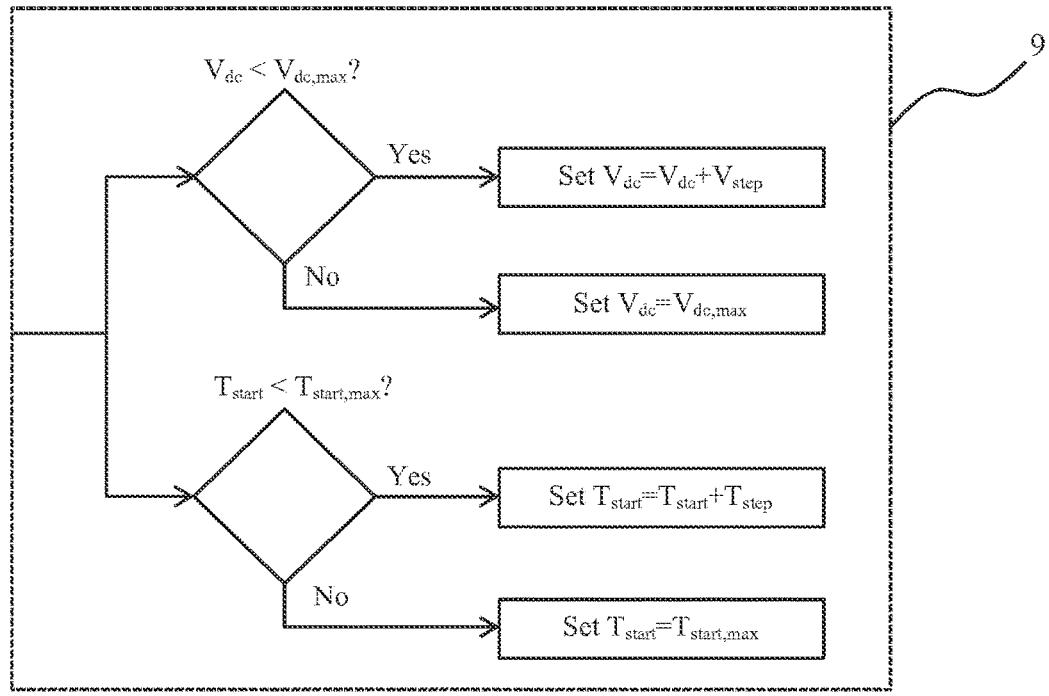
FIG. 3 shows a flowchart of an exemplary embodiment of increasing the starting criteria.

In the following, exemplary operation disclosed herein is described in connection with FIGS. 1, 2, and 3 showing a flowchart of an exemplary embodiment. In FIG. 1, a PV power generation system is started 1 when voltage from panels exceeds or reaches a set limit $V_{dc}$ and a time $T_{start}$ expires after a voltage limit is crossed. Thus when the voltage from the panels reaches the set limit $V_{dc}$, a timer is started for calculating the delay $T_{start}$. After the time delay the converter system is started, and the obtained power $P_{ac,k}$ from the panel array is determined 2.

After start-up of the converter and determination of power, it is also determined whether the start-up is a morning start-up 3. This can be carried out by using a real time clock, for example. If the start-up is not determined to be a morning start-up, no changes are made to the starting parameters, and the values of $V_{dc}$ and $T_{start}$ are kept as they are 4.

If the start-up is a morning start-up, it is determined whether the actual determined power is in the optimal range 5. As described above, the optimal range for the starting power can be determined as a power limit within hysteresis limits. Once the actual power in the start-up is within the range, it is determined that the starting parameters need not to be changed 6. If the starting power is not within the range, it is checked 7 whether the power is above the optimal range. If the determined actual power is higher than the defined range, the starting parameters are decreased 8, and if the power is not higher, the starting parameters are increased 9 since it is already determined that the power is outside the optimal range. Decreasing and increasing the starting parameters (blocks 8 and 9) are shown in a more detailed manner in FIGS. 2 and 3.

FIG. 2 shows an exemplary embodiment of decreasing the starting parameters; e.g., block 8 of FIG. 1. Once it is determined that the power is above the optimal range, the starting parameters are decreased. In the process of decreasing the parameters, it is checked 81 whether the starting voltage $V_{dc}$ is higher than the minimum value set for the starting voltage $V_{dc,min}$. If the starting voltage is higher than the lower limit, the value starting voltage is lowered 82. In the embodiment of FIG. 2, the starting voltage is lowered by subtracting a constant value $V_{step}$ from the starting voltage used in the start-up. Thereby in the next morning start-up the converter system is started with a lower actual voltage of the panel array.

If the starting voltage $V_{dc}$ is not higher than the minimum starting voltage $V_{dc,min}$, the starting voltage receives the value of the minimum starting voltage 83. In other words, the starting voltage is at the lower practical limit already and cannot be further reduced.

The decrease of starting parameters of FIG. 2 also discloses that the starting delay $T_{start}$ is compared 84 with the minimum starting delay $T_{start,min}$. If the starting delay used is greater than the minimum value, the starting delay is decreased 83. In the embodiment of FIG. 2, the starting delay is decreased by subtracting a constant $T_{step}$ from the current value of $T_{start}$. If the starting delay $T_{start}$ is not greater than the minimum value of the delay, the $T_{start}$ obtains the value of the minimum delay.

FIG. 3 shows an exemplary embodiment of increasing 9 the starting parameters due to the starting power being below a specified (e.g., optimal) range. In FIG. 3, it is checked 91 whether the starting voltage $V_{dc}$ used is below the upper limit set for the starting voltage $V_{dc,max}$. If the starting voltage is lower than the upper limit, the voltage is increased 92 by adding an increment $V_{step}$ to the present starting voltage $V_{dc}$ for obtaining a starting voltage that is used in the next morning start-up and should always be less than an open loop voltage. If the starting voltage is not lower than the upper limit, the value of the upper limit $V_{dc,max}$ is given as a value for the starting voltage $V_{dc}$.

Further in FIG. 3 the starting parameters are increased by comparing 94 the starting delay $T_{start}$ with a maximum value of the starting time $T_{start,max}$, and increasing 95 the starting delay when the value of the starting delay used is lower than the maximum value. The increase is carried out by adding a constant $T_{step}$ to the current value of time delay. If the used starting delay is not lower than the maximum value, the maximum value is set for the time delay $T_{start}$.

In the exemplary embodiments of FIGS. 2 and 3, the increase and decrease of both the starting voltage and time delay are carried out with constants $V_{step}$ and $T_{step}$. As mentioned, these values may also be variables. Further, the values used for increasing and decreasing may differ from each other. This is to say that $V_{step}$ and $T_{step}$ may have different values for increasing the parameters and for decreasing the parameters.

An exemplary method disclosed herein can be implemented in a converter system that is connectable to a solar panel array. The converter system also can include connectors for feeding the power from the converter system to an alternating grid or to a DC system. The DC system may include DC storage means or a DC network.

Figure 4:
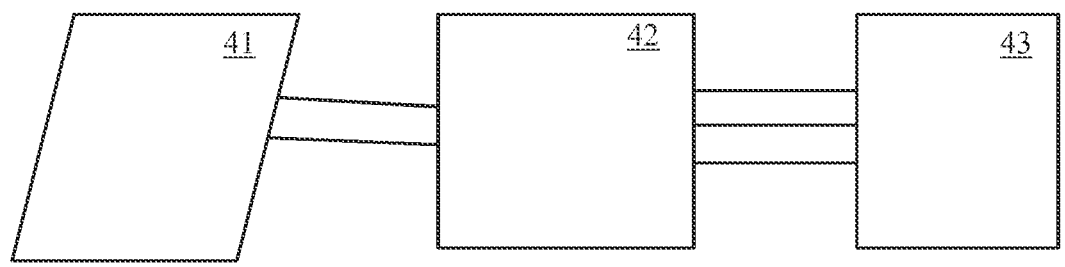
FIG. 4 shows a simplified structure of an exemplary photovoltaic power generation system.

It is known that many types of converters exist that operate in connection with solar power. The system disclosed herein is not limited to the topology of the system, and thus the system may include multiple phase outputs and multiple converter stages. FIG. 4 shows a simplified structure of a system disclosed herein, in which a solar panel array 41 is connected to a converter structure 42. The converter structure 42 is further connected to an AC grid 43.

For implementing the method, the system can include an arithmetic unit and storage means for storing the various parameters used in the operation. Further, the system can include means for carrying out the various comparisons of the method.

It will be apparent to a person skilled in the art that, as technology advances, the inventive concepts disclosed herein can be implemented in various ways. The invention and its embodiments are not limited to the examples described herein but may vary within the scope of the claims.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of optimizing one or more starting parameters of a solar power generator system, wherein the solar power generator system includes a solar panel array and a converter for converting power obtained from the solar panel array, the method comprising:
   measuring an output voltage of the solar panel array;
   comparing the output voltage with a starting voltage ($V_{dc}$);
   starting the solar power generator system when the output voltage of the solar panel array exceeds the starting voltage ($V_{dc}$);
   measuring power obtained from the solar panel array after a morning start;
   comparing the power obtained from the solar panel array with a known limit value ($P_{ac,opt}$); and
   changing the one or more starting parameters on a basis of the comparing of power;
   wherein one of the one or more starting parameters is a time delay used in the starting of the solar power generator system, and changing the one or more starting parameters comprises:
   decreasing the time delay when the power obtained from the solar panel is higher than a upper limit, and
   increasing the time delay when the power obtained from the solar panel is lower than a lower limit.

2. A method as claimed in claim 1, wherein the comparing of the power obtained from the solar panel with the known limit value ($P_{ac,opt}$) comprises:
   comparing the power obtained from the solar panel with the lower limit and the upper limit; and
   changing the one or more starting parameters when the power obtained from the solar panel is higher than the upper limit or lower than the lower limit.

3. A method as claimed in claim 2, wherein one of the one or more starting parameters is a starting voltage level, and the changing of the one or more starting parameters comprises:
   decreasing the starting voltage when the power obtained from the solar panel is higher than the upper limit; and
   increasing the starting voltage when the power obtained from the solar panel is lower than the lower limit.

4. A method as claimed in claim 3, wherein the decreasing or increasing of the starting voltage is carried out by adding a voltage step ($V_{step}$) to the starting voltage used in a present starting, or by subtracting a voltage step ($V_{step}$) from the starting voltage used in the present starting.

5. A method as claimed in claim 4, wherein the starting voltage has an upper and lower limit value ($V_{dc,max}$, $V_{dc,min}$), which values limit the increasing and decreasing of the starting voltage.

6. A method as claimed in claim 5, wherein the voltage step ($V_{step}$) is a constant or a variable whose value depends on the difference between the current starting voltage and the upper or lower limit value ($V_{dc,max}$, $V_{dc,min}$).

7. A method as claimed in claim 6, comprising:
   generating an alarm when one or more of the one or more starting parameters are at its limit value, or increase at a specified rate.

8. A method as claimed in claim 7, wherein the decreasing or increasing of the time delay is carried out by adding a time step ($T_{step}$) to the time delay used in the present starting or by subtracting the time step ($T_{step}$) from the time delay used in the present starting.

9. A method as claimed in claim 8, wherein the time delay has an upper and lower limit value ($T_{start,max}$, $T_{start,min}$), which values limit the increasing and decreasing of the time delay.

10. A method as claimed in claim 9, wherein the time step ($T_{step}$) is a constant or a variable whose value depends on the difference between the current time and the upper or lower limit value ($T_{start,max}$, $T_{start,min}$).

11. A method as claimed in claim 2, wherein the decreasing or increasing of the starting voltage is carried out by adding a voltage step ($V_{step}$) to the starting voltage used in a present starting, or by subtracting a voltage step ($V_{step}$) from the starting voltage used in the present starting.

12. A method as claimed in claim 1, wherein one of the one or more starting parameters is a starting voltage level, and the changing of the one or more starting parameters comprises:
    decreasing the starting voltage when the power obtained from the solar panel is higher than the upper limit; and
    increasing the starting voltage when the power obtained from the solar panel is lower than the lower limit.

13. A method as claimed in claim 12, wherein the starting voltage has an upper and lower limit value ($V_{dc,max}$, $V_{dc,min}$), which values limit the increasing and decreasing of the starting voltage.

14. A method as claimed in claim 1, wherein the decreasing or increasing of the starting voltage is carried out by adding a voltage step ($V_{step}$) to the starting voltage used in a present starting, or by subtracting a voltage step ($V_{step}$) from the starting voltage used in the present starting.

15. A method as claimed in claim 14, wherein the voltage step ($V_{step}$) is a constant or a variable whose value depends on the difference between a current starting voltage and the upper or lower limit value ($V_{dc,max}$, $V_{dc,min}$).

16. A method as claimed in claim 1, wherein the decreasing or increasing of the time delay is carried out by adding a time step ($T_{step}$) to the time delay used in the present starting or by subtracting the time step ($T_{step}$) from the time delay used in the present starting.

17. A method as claimed in claim 16, wherein the time step ($T_{step}$) is a constant or a variable whose value depends on the difference between the current time and the upper or lower limit value ($T_{start,max}$, $T_{start,min}$).

18. A method as claimed in claim 1, wherein the time delay has an upper and lower limit value ($T_{start,max}$, $T_{start,min}$), which values limit the increasing and decreasing of the time delay.

19. A method as claimed in claim 1, comprising:
    generating an alarm when one or more of the one or more starting parameters are at its limit value.

20. A method as claimed in claim 1, comprising:
    generating an alarm when one or more of the one or more starting parameters increase at a specified rate.

* * * * *